United States Patent [19]

Hirami et al.

[11] Patent Number: 5,047,956

[45] Date of Patent: Sep. 10, 1991

[54] INFORMATION PROCESSING DEVICE HAVING A FUNCTION OF DESIGNATING A PRINTING-START POSITION

[75] Inventors: Akira Hirami; Fumihiro Inoue, both of Nara, Japan

[73] Assignee: Sharp Kabushiki Kaisha, Osaka, Japan

[21] Appl. No.: 382,235

[22] Filed: Jul. 19, 1989

[30] Foreign Application Priority Data

Jul. 22, 1988 [JP] Japan .................................. 63-184293

[51] Int. Cl.⁵ .............................................. G06K 15/00
[52] U.S. Cl. .................................... 364/519; 364/200; 364/235 MS File
[58] Field of Search ............................. 364/518-520, 364/235 MS File, 930 MS File; 346/54; 156/DIG. 49

[56] References Cited

U.S. PATENT DOCUMENTS 4,666,321 5/1987 Kumagai .............................. 400/286

Primary Examiner—Arthur G. Evans
Attorney, Agent, or Firm—Cohen, Pontani & Lieberman

[57] ABSTRACT

An information processing device having a function of designating a printing-start position comprises a keyboard for inputting various data and applying various designations, a printer for printing various data on a sheet, a memory for storing data inputted from the keyboard, a control unit for controlling the printer so that printing is started from a printing-start position when the designation of the printing-start position on the sheet is applied from the keyboard and for reading data from the memory and causing the printer to print.

3 Claims, 3 Drawing Sheets

FIG. 5

```
██████████ DESIGNATION OF LABEL PRINTING ██████████
PRINTING—START POSITION    1    ROW
                          LEFT  (COLUMN: LEFT RIGHT)
PRINTING SPEED            HIGH  (NORMAL HIGH)
OFFICIARY TITLE           YES   (TITLE REQIRED? YES NO)
TITLE OF COURTESY         Mr.   (Mr. Ms. Dr. Prof. None)
NUMBER OF CASE TO BE      ALL   (ONE ALL)
       PRINTED
NUMBER AT WHICH           001
PRINTING IS STARTED

MANAGING DIRECTOR
                          ICHIRO HAYAKAWA

JAPANESE FULL
                                    ALPHABET SIZE
                                    9:10  30 AUGUST 1988
```

(ADDRESS PRINTING)

| NORMAL SPEED | HIGH SPEED | OFFICIARY TITLE REQIRED | OFFICIARY TITLE NOT REQUIRED | END | ONE CASE | ALL CASES | | | NEXT ADDRESS | PREVIOUS ADDRESS |

INFORMATION PROCESSING DEVICE HAVING A FUNCTION OF DESIGNATING A PRINTING-START POSITION

BACKGROUND OF THE INVENTION

1. Field of the Invention

The present invention relates to an information processing device, such as a word processor, having a printing device capable of printing various data on a sheet.

2. Description of the Related Art

In a conventional information processing device, when the printing command is applied, letters are always printed from the top of a sheet.

However, since printing is always started from the top of the sheet, when printing is carried out on each of a plurality of labels which are affixed to the sheet, for example, printed letters are likely to be printed off of or out of registry with the label or the printed face of the sheet is likely to be used up. This causes a problem that printing can not be effectively done.

In Japanese Laid-Open Patent No. 38931/1987, there is disclosed a device in which when letters in the first line of a program list to be printed are more than the number of letters which can be printed in one line, a printing-start position of the second line and below is moved by a desired number of letters so that data in the first line can be distinguished from that in the next line.

In Japanese Laid-Open Patent No. 113262/1987, there is disclosed a device in which a figure or a numerical value in millimeters is marked with a skip character in an inputted document and a lateral printing-start position is calculated based upon the value so that the lateral printing-start position can be designated.

SUMMARY OF THE INVENTION

Accordingly, it is an object of the present invention to provide an information processing device having a function of designating a printing-start position in which the printing-start position can be designated using a keyboard so that work efficiency is improved in printing.

The information processing device having a function of designating a printing-start position comprises input means for inputting various data and applying various designations, printing means for printing various data on a sheet, storage means for storing data inputted from the input means, printing-start position control means for controlling the printing means so that printing is started from a printing-start position when the designation of the printing-start position on the sheet is applied from the input means, and reading means for reading data from the storage means and for making the printing means print after the printing-start position control means controls the printing-start position.

In this device, data inputted from the input means is stored in the storage means. When the designation of the printing-start position is applied from the input means, the printing-start position control means controls the printing means so that printing is started on a sheet from the designated printing-start position.

After the printing-start position control means controls the printing-start position, the reading means reads data from the storage means and causes the printing means to print the data.

In this way, printing can be started on the sheet from any printing-start position designated by or from the input means.

BRIEF DESCRIPTION OF THE DRAWINGS

FIG. 5 is a diagram illustrating an example of information displayed on a screen for printing on a label.

DESCRIPTION OF THE PREFERRED EMBODIMENT

Figure 1:
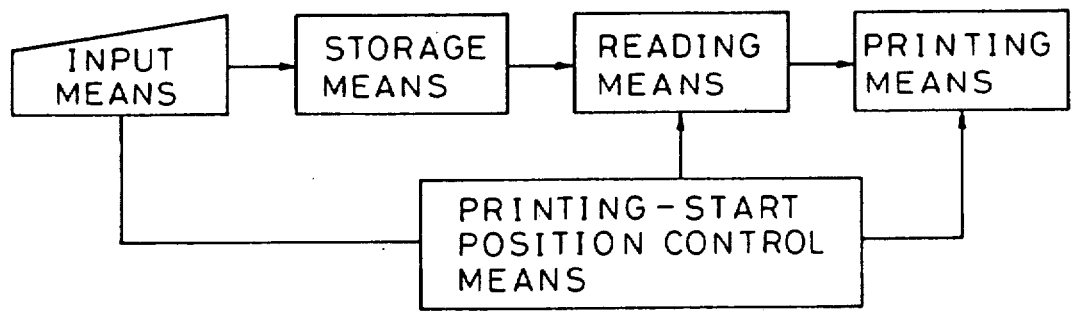
FIG. 1 is a block diagram showing an architecture of the present invention.

The information processing device having a function of designating a printing-start position according to the present invention has a basic architecture mainly including input means, printing means, storage means, printing-start position control means and reading means, as shown in FIG. 1.

The input means may be used to input various data and apply various designations. For this purpose, a keyboard, a pointing device or the like may be used.

The printing means may be capable of printing various data on a sheet; an impact type or thermal type serial dot printer is mainly used.

The storage means may store various data inputted from the input means; an internal memory such as a RAM or an external storage medium such as a floppy disc device and a magnetic disc device are used.

The printing-start position control means may control the printing means to print letters from the printing-start position when the designation of the printing-start position on a sheet is applied from the input means. The reading means may read data from the storage means and make the printing means print letters after the printing-start position control means controls the printing-start position. Usually, the printing-start position control means and the reading means are conviently implemented with a microprocessor.

The preferred embodiment of the present invention will now be explained with reference to the accompanying drawings. It is not, however, intended to limit the invention to the precise form disclosed.

Figure 2:
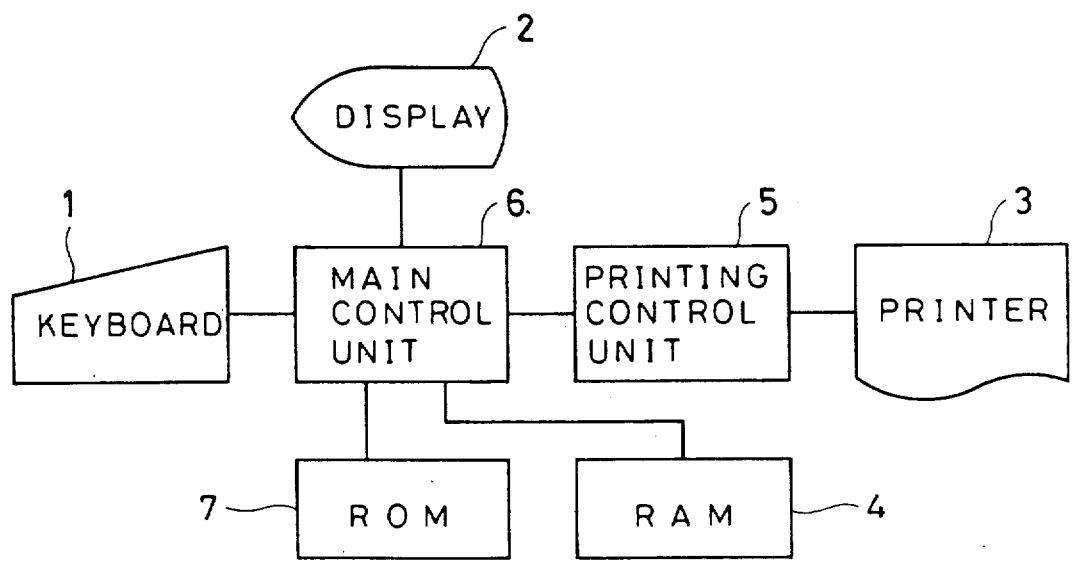
FIG. 2 is a block diagram showing an architecture of an application of the present invention to a word processor.

FIG. 2 is a block diagram showing an architecture of an application of the invention to a word processor.

Referring to FIG. 2, this application includes a keyboard 1 for inputting various data and applying various designations, a display 2 such as a CRT display or an LCD (liquid crystal display), a printer 3 capable of printing various data on a sheet (explained below) to which a label is affixed, a random access memory or RAM 4 for storing various data inputted from the keyboard 1, a printing control unit 5 and a main control unit 6 for controlling all of the word processor system operations and for controlling the input/output operation. The printing control unit 5 and the main control unit 6 comprise a CPU.

The printing control unit 5 receives a designation of a printing-start position on a sheet from the keyboard 1 and controls the printer 3 to print letters on the sheet from the printing-start position. The main control unit 6 reads data from the RAM 4 and causes the printer 3 to print the data through the printing control unit 5 after the printing control unit 5 controls the printer 3 with regard to the printing-start position.

Reference numeral 7 denotes a read only memory or ROM which stores a program for operating the main control unit 6 and a screen display pattern for designating the printing-start position on a screen of the display 2.

Address printing on a sheet to which a label is affixed will now be described.

Figure 4:
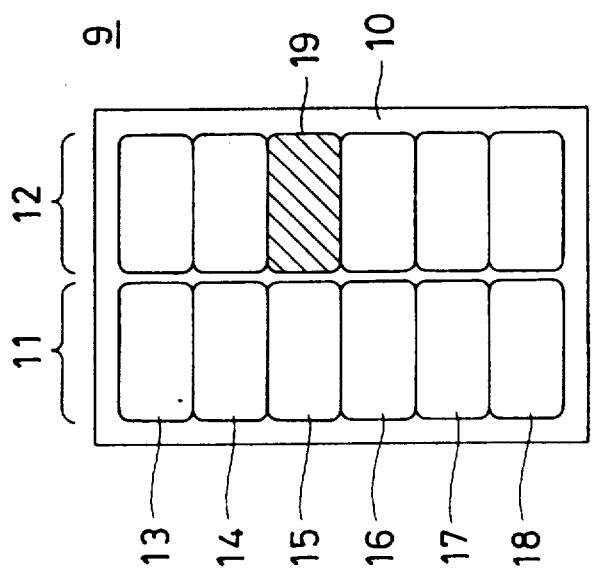
FIG. 4 is a diagram illustrating an example of a sheet to which labels are affixed.

FIG. 4 is a diagram illustrating an example of a sheet to which labels are affixed. As shown in FIG. 4, a sheet 9 has a printing face 10 whose lateral width is within a printing width of the printer 3. Twelve pieces of label are affixed to the printing face 10; six pieces in the left column 11, the first row 13, the second row 14, the third row 15, the fourth row 16, the fifth row 17 and the sixth row 18, and another six pieces in the right column 12.

The sheet 9 is set in a predetermined position in the printer 3, that is, in a position where printing is carried out on a label in the first row 13, the left column 11.

The sheet 9 is in A4 size (210×298 mm). The twelve labels of 84×42 mm are affixed to the sheet 9 with left and right margins of 20 mm width and center margins of 2 mm width. There are 23 mm top and bottom spaces.

The ROM 7 stores various control data for printing an address on the prescribed sheet 9 in advance.

After the sheet 9 is set on a predetermined position in the printer 3, the setting of a printing-start position on the labels is performed in 42 mm of a line feed. Usually, the left margin is set at a position where the label in the left column 11 is printed first. However, when a designation that the label in the right column 12 should be printed first is applied, the left margin is temporarily shifted to the right by 86 mm.

A line feed pitch in printing is constant and seven lines of address data can be printed on a piece of the label.

The printer 3 can print various address data on each label affixed to the sheet 9.

The address data is inputted from the keyboard 1. Inputted address data is stored in the RAM 4 by the control of the main control unit 6. Further, a designation of the printing-start position on the sheet 9 is applied from the keyboard 1.

The designation of the printing-start position is carried out by reading and displaying an input screen display pattern as shown in FIG. 5.

Specifically, a label position, that is, identifying which row and which column of label on the sheet 9 should be printed first, is designated based upon the displayed screen using the keyboard 1.

The main control unit 6, when the row and column in the sheet 9 to be printed first is designated, transfers information about the designated position to the printing control unit 5.

The printing control unit 5 receives the information, transfers it into a control code of the printer 3 based upon the above mentioned various control data for printing an address on the sheet 9 and controls the printer 3 to print on the designated label on the sheet 9.

In the input screen display shown in FIG. 5, for example, when label printing is so designated that printing is to be carried out beginning at the label in the fourth row on the left for all cases, the sheet 9 is fed so that the label in the fourth row 16, and the left column 11 may be printed first.

At this time, the main control unit 6 classifies the address data stored in the RAM 6 into address data to be printed on the labels in the left column 11 and address data to be printed on the labels in the right column 12. As a result, classification is carried out so that address data to be printed first may be printed on a left label, and address data to be printed next may be printed on a right label.

The main control unit 6 reads the first line of the first and second address data from the RAM 4 and transmits the data to the printing control unit 5. Thus, the first line of that address data for the two labels is printed. When the first line includes a postal code, for example, two postal codes for the respective address data are read and printed.

Then, the second line of the first and second address data is read from the RAM 4 and transferred to the printing control unit 5. Thus, the second line of that address data for the two labels is printed. For example, when the second line includes a postal district, two postal districts for the respective address data are read and printed. Printing is repeated until maximum of seven lines are printed.

In the input screen display shown in FIG. 5, for example, when label printing is designated so that printing is carried out from the label in the third row on the right for all cases, the sheet 9 is fed so that the label in the third row 15, and the right column 11 may be printed first.

The printing control unit 5 shifts the left margin of the printer 5 to the right so that printing is carried out from the label in the right column 12. After that, the first line of the first address data is read, transferred to the printing control unit 5, and then printed. Printing is repeated until seven lines in maximum are printed.

After the completion of printing, the left margin is shifted back to the original position, and the sheet 9 is fed to start printing from the label in the fourth row 16, the left column 11. Then, printing similar to the above is repeated; the first line of the first and second address data is read from the RAM 4 and printed.

The operation of the disclosed embodiment will now be explained with reference to the flow chart of FIG. 3.

It is assumed herein that a plurality of address data are stored in the RAM 4, and that the address data are printed on a sheet to which a label is affixed.

Figure 3:
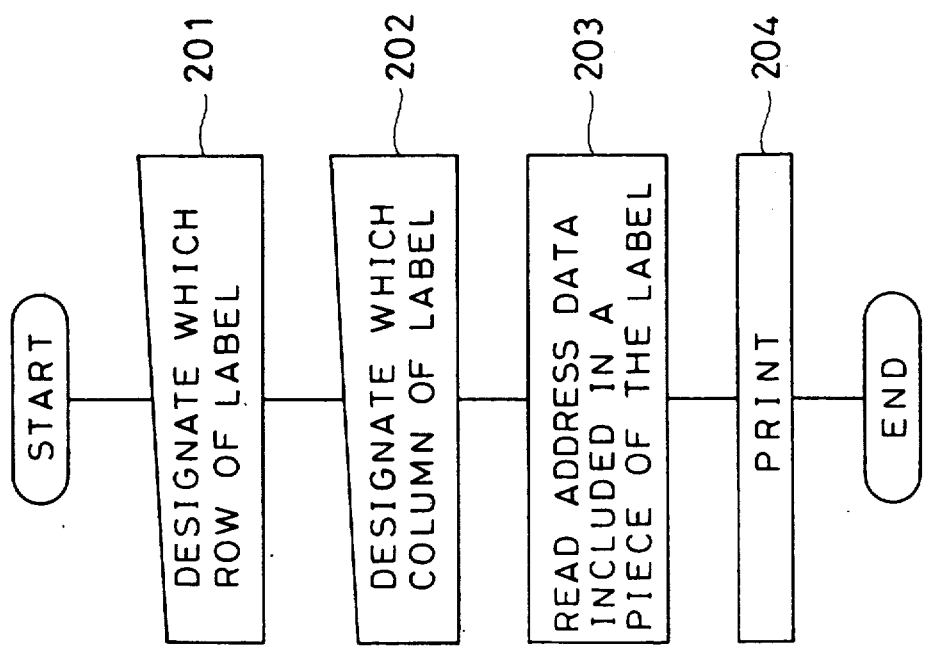
FIG. 3 is a flow chart illustrating an operation of the disclosed embodiment.

When a printing command is input from the keyboard 1, the main control unit 6 performs the following process as shown in FIG. 3.

First, a screen display pattern as shown in FIG. 5 is read and displayed on the screen of the display 2.

A designation of the desired printing position is made based upon the displayed screen using the keyboard 1. First, the specific row of labels to be printed is designated (Step 201), and then the specific column of labels to be printed is designated (Step 202). When a label 19 (marked with oblique lines in FIG. 4) is to be printed first, the designation is "the third row, the right label."

After the designation, the printing control unit 5 controls the printer 3. Consequently, the sheet 9 is fed and the printer 3 is controlled so that the designated label may be printed.

Address data included in a piece of the label are read from the RAM 4 (Step 203) and printed on a designated label (Step 204).

Since a printing-start position can be designated using the keyboard 1, even when a sheet to which a plurality of labels are affixed is used and the labels must be individually printed, printing is performed by individually designating the labels. Consequently, work efficiency is improved in printing.

Although address data are printed on an A4 size sheet to which twelve labels are affixed in the above embodiment, it also is possible that the size of the sheet and label not be limited to the above and that the number of labels affixed to the sheet 9 not be limited to the above.

In such case, control data about the size of the sheet 9 and label and the layout of the labels may be stored in the ROM 7 in advance so that printing can be controlled based upon the stored control data.

The size of the sheet 9 and label, the layout of the labels and the like may also be inputted as a parameter from the keyboard.

What is claimed is:

1. An information processing device operable for printing labels, arranged in rows and columns on a sheet, from a user-specifiable print-start position, comprising:

input means for inputting data including multiple-line address data to be printed and position start data designating the label position on the sheet, by row and column, at which label printing is to begin;

data storage means for storing the data inputted from said input means;

position information storage means for storing position information of the labels which are arranged in rows and columns on the sheet;

printing means operable for printing the address data on the labels;

printing start position control means for calculating, based upon the position start data inputted from said input means and the position information stored in said position information storage means, the print-start position on the sheet at which printing is to begin so as to print the multiple-line address data on the sheet-arranged labels beginning with the row-and-column identified label designated by the position start data; and control means for reading the address data and position start data from said storage means and for causing said printing means to operatively print the address data, in accordance with the position start data calculated by said printing start position control means, sequentially on the labels affixed to the sheet from the label position designated by the row-and-column position start data inputted from said input means.

2. An information processing device in accordance with claim 1, wherein said control means includes reading means for reading from said storage means address data corresponding to one address to be printed on a single label and for causing said printing means to print said single letter.

3. An information processing device in accordance with claim 1, further comprising display means for displaying on a screen an input screen used for designating positions of the labels which are arranged in rows and columns on the sheet, wherein said input means includes a keyboard for designating, based upon the input screen displayed on the screen, the label positions stored in said position information storage means.

* * * * *